United States Patent
Laulo

(10) Patent No.: US 6,650,749 B1
(45) Date of Patent: Nov. 18, 2003

(54) METHOD AND SYSTEM FOR PROTECTING EQUIPMENT AND SWITCHING FUNCTIONALITY IN A TELECOMMUNICATION SYSTEM

(75) Inventor: Karl Peder Laulo, Arendal (NO)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/355,633
(22) PCT Filed: Jan. 30, 1998
(86) PCT No.: PCT/NO98/00032
  § 371 (c)(1),
  (2), (4) Date: Dec. 2, 1999
(87) PCT Pub. No.: WO98/34366
  PCT Pub. Date: Aug. 6, 1998

(30) Foreign Application Priority Data

Feb. 3, 1997 (NO) .................................... 970466

(51) Int. Cl.[7] ................................................ H04L 1/22
(52) U.S. Cl. ............. 379/279; 379/221.03; 379/221.04
(58) Field of Search ........................... 379/219, 221.01, 379/221.03, 221.04, 221.06, 279; 370/216

(56) References Cited

U.S. PATENT DOCUMENTS

| | | | |
|---|---|---|---|
| 4,382,294 A | | 5/1983 | Beuscher et al. |
| 5,014,261 A | | 5/1991 | Shinbashi et al. |
| 5,408,462 A | | 4/1995 | Opoczynski |
| 5,535,191 A | * | 7/1996 | Park |
| 5,570,345 A | * | 10/1996 | Kaprielian et al. |
| 5,740,157 A | * | 4/1998 | Demiray et al. ............ 370/219 |
| 5,809,010 A | * | 9/1998 | Bruce ........................... 370/217 |
| 5,896,474 A | * | 4/1999 | Van Deventer et al. ..... 370/216 |
| 5,930,232 A | * | 7/1999 | Miller .......................... 370/216 |
| 5,963,545 A | * | 10/1999 | Shibasaki .................... 370/242 |
| 5,963,634 A | * | 10/1999 | Kantola et al. .............. 379/279 |
| 6,038,210 A | * | 3/2000 | Kim ............................. 370/216 |
| 6,438,126 B1 | * | 8/2002 | Roos ........................... 370/369 |

FOREIGN PATENT DOCUMENTS

| | | |
|---|---|---|
| GB | 2294613 | 5/1996 |
| JP | 8-212095 A | 8/1996 |
| WO | 95/10146 | 4/1995 |
| WO | 95/24803 | 9/1995 |
| WO | 95/29544 | 11/1995 |

OTHER PUBLICATIONS

ITU–T Recommendation G.782—"Types and General Characteristics of Synchronous Digital Hierarchy (SDH) Equipment", Jan. 1994.

(List continued on next page.)

Primary Examiner—William J. Deane, Jr.

(57) ABSTRACT

The present invention relates to a method and system for protecting equipment and switching functionality in a telecommunication system, which system comprises a central processor and regional processors, one or more of which is/are standby processor(s), and in order to avoid that the system configuration set by command is changed if protection switching occurs, and in order to provide a flexible concept that allows different types of protection switching methods, there is according to the present invention suggested a solution by introducing a protection group between the existing client(s) and server layers (i.e. switching network terminals), said protection group administering which server units should be working (active) and which should be standby units.

10 Claims, 6 Drawing Sheets

Protection Group concept, principle

OTHER PUBLICATIONS

ITU–T Recommendation G.783—"Characteristics of Synchronous Digital Hierarchy (SDH) Equipment Functional Blocks", Jan. 1994.

ITU–T Recommendation G.803—"Architectures of Transport Networks Based on the Synchronous Digital Hierarchy (SDH)", Mar. 1993.

ITU–T Recommendation G.841—"Types and Characteristics of SDH Network Protection Architectures", Jul. 1995.

European Telecommunication Standard, ETS 300 746, "Transmission and Multiplexing (TM); Synchronous Digital Hierarchy (SDH); Network protection schemes; Automatic Protection Switch (APS) protocols and operation", Feb. 1997.

European Telecommunications Standards Institute, TS 101 009, "Transmission and Multiplexing (TM); Synchronous Digital Hierarchy (SDH); Network protection schemes; Types and characteristics", Nov. 1997.

European Telecommunication Standard, EST 300 417–3–1, "Transmission and Multiplexing (TM); Generic requirements of transport functionality of equipment; Part 3–1; Synchronous Transport Module–N (STMN) regenerator and multiplex section layer functions", Jun. 1997.

European Telecommunications Standards Institute, DTR/TM–03041, Version 2.10, "Transmission and Multiplexing (TM) SDH Network Protection Interworking", Sep. 1996.

\* cited by examiner

Figure 1. Existing Information Model, Principle

Figure 2. Protection introduced at SNT level

Figure 3. Protection Group concept, principle

| Devices | Data representing a call |
|---|---|
| DIP | Digital Path |
| EM | Extension Module |
| MS | Multiplex Section |
| SNT | Switching Network Terminal |
| VC | Virtual Container |

*Figure 4. Example, Protection Group Concept for an SDH ET with MSP 1+1 protection*

Figure 5. Multiplex Section Protection 1:3, example

METHOD AND SYSTEM FOR PROTECTING EQUIPMENT AND SWITCHING FUNCTIONALITY IN A TELECOMMUNICATION SYSTEM

FIELD OF THE INVENTION

The present invention relates to a method for protecting equipment and switching functionality in a telecommunication system, which system comprises a central processor and regional processors, one or more of which is/are standby processor(s).

The invention also relates to a system for protecting such equipment and switching functionality.

BACKGROUND OF THE INVENTION

Within a switching system there is a requirement that no more than 32 traffic devices are allowed to be affected by a single fault (equipment fault or transmission fault).

When PCM systems with higher bit rates (above 2 Mbit/s) are being terminated in the telephone exchange, equipment protection and protection switching are required in order to fulfil the requirement above. Equipment protection is also needed for other types of equipment which control more than 32 traffic devices, e.g. signalling terminals, Access Unit, boards, etc. This means that for the equipment there must exist a standby unit that can take over in case of failure.

The Protection Switching mechanisms are specified in references 2–9.

With the existing information models in Ericsson's digital telephone exchange AXE, introducing Equipment Protection and Protection Switching causes a number of problems:

How to connect/define the working & standby equipment?

How to notify the operator when protection switching occurs?

How do we know that the protection mechanisms work?

How do we know which equipment is active and which is standby?

How do we initiate/terminate the protection switching capability?

How do we perform manual switching?

How to handle the traffic devices?

And a number of other problems.

In FIG. 1 there is illustrated schematically a printed principle of an existing information model.

In the model illustrated in FIG. 1, the EM is the representation of the hardware as seen from the control system (Central Processor and Regional Processors). The SNT is the representation of the hardware as seen from the "application system".

A Device is a data record containing data representing a call.

DIP is an information element representing the transmission. Only equipment that have a line interface (transmission interface) have a DIP connected.

The invention introduces a new concept "Protection Group" into the information model in order to control the Equipment Protection & Protection Switching functionality.

Known Solutions

There have been presented some ideas of using the existing information model in order to control the Equipment Protection & Protection Switching function.

For example the devices are connected to an SNT as before. In addition a new SNT is defined that is supposed to take over the control in case of a failure, see FIG. 2 which illustrates a protection introduced at SNT level.

One of the problems with such prior art solutions is that the system configuration set by command is changed if protection switching occur.

In case of a protection switch the devices are connected to another SNT than originally connected to by command.

It is also very difficult to see which equipment is standby or active, and also difficult to see which equipment forms a protected pair.

In addition this solution causes a mixing of functionality on SNT level since the SNTs must also contain the protection mechanisms.

With this solution it is also very difficult to make a flexible concept that allows different types of protection switching methods, e.g. 1+1 protection or 1:n protection Further Prior Art WO95/10146 (Opoczynski/ADC Telecommunications Inc.) relates to backup equipment which will come into operation if a failure should occur in a telecommunication system. A central processor is used for monitoring the status of a plurality of pairs of telecommunication modules, each pair having an operating module and a standby module. Upon failure the central processor signals to a standby module, which orders switching of all modules being involved, in case a standby module is activated.

WO95/224803 (Madonna et al./Excel, Inc.) discloses a programmable telecommunication switch with automatic backup of line cards which provide complete redundance, namely including multiple I/O busses, standby I/O card and standby line card.

WO95/29544 (Li et al./Cisco Systems, Inc.) relates to a system and a protocol for routing data packets from a host on a LAN by means of a virtual address belonging to a plurality of routings. If one of the routers becomes inoperative, a standby router will emulate a new router.

U.S. Pat. No. 5,014,261 (Masahiro et al./Fujitsu Limited) discloses a switching system for switching a unit or a plurality of units which are in a first working condition, to one or a plurality of units which are in a standby condition. Upon failure in one or more of the working units, this unit or units will automatically be connected to a common standby unit.

GB 2 294 613 (Bruce/Northern Telecom Limited) discloses a telesystem comprising multiplexed lines, and in order to avoid the problem of having separate line controllers, it is suggested that each tributary channel has an interface towards the multiplexers via a protecting unit, which can switch the tributaries between a first multiplexer and a second multiplexer when the performance of the system using said first operation multiplexer has been degraded.

However, none of these publications give any instructions for a new "protection group" concept, namely to introduce such a protection group between existing clients (devices) and the level of servers (SNT level).

SUMMARY OF THE INVENTION

The idea of the present invention is to introduce a new concept, here called "Protection Group", that controls the protection switching mechanisms.

The idea is to introduce the Protection Group between the existing client and server layers in order to protect the client(s) from faults at the server layer.

The Protection Group controls the configuration on server layer with respect to protection mechanisms. This means that the Protection Group administrates which server units should be working (active) and which should be standby units.

At the server layer the different server units have their own working state as before, and the units do not have any information about configurations for protection mechanisms.

In case of a fault on server layer, this is reported to the Protection Group, which then decides whether to switch to a standby unit or to inform the client that a fault has occurred (i.e. request a blocking of the client).

In other words, in connection with a method as stated in the preamble, such a method is according to the invention characterized by introducing a protection group between the existing client(s) and server layers (i.e. switching network terminals), said protection group administering which server units should be working (active) and which should be standby units.

The method may appropriately be implemented when said method comprises the use of a protection group which communicates both with the server(s) (i.e. switching network terminals) and the client(s) or device(s) in question, and which protection group in case of a fault on server layer decides whether to switch to a standby unit or to inform a client that a fault has occurred (i.e. requesting blocking of client).

A system for protecting equipment and switching functionality in a telecommunication system, which system comprises a central processor and regional processes, one or more of which is/are standby processor(s), will accordingly, according to the present invention be characterized in that said system comprises a protection group means introduced between the existing client(s) and server layers (i.e. switching network terminals), said protecting group comprising means for administering which server units should be working (active) and which should be standby units.

Further features and advantages of the present invention will appear from the following description taken in connection with the enclosed drawings, as well as from the appending patent claims.

DETAILED DESCRIPTION OF EMBODIMENTS

Figure 1:
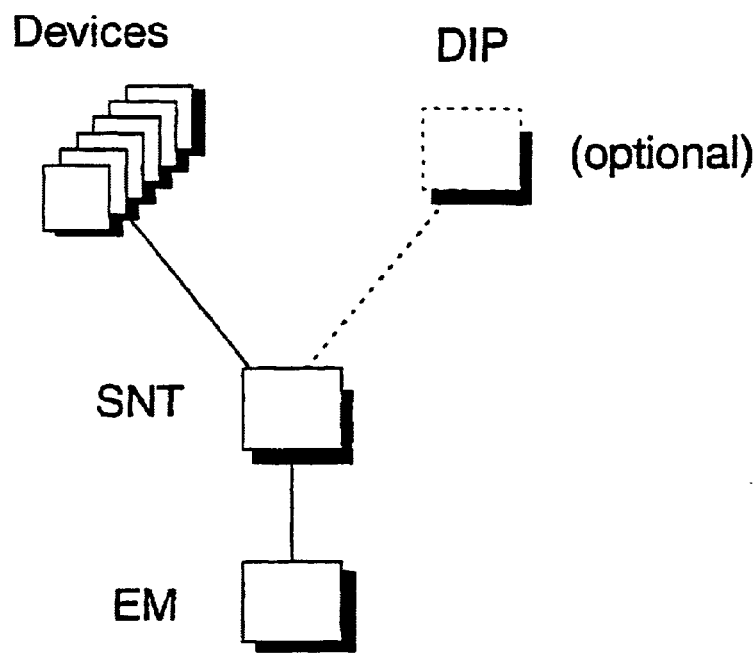
FIG. 1 is a block diagram illustrating the principle of an existing information model.
Figure 2:
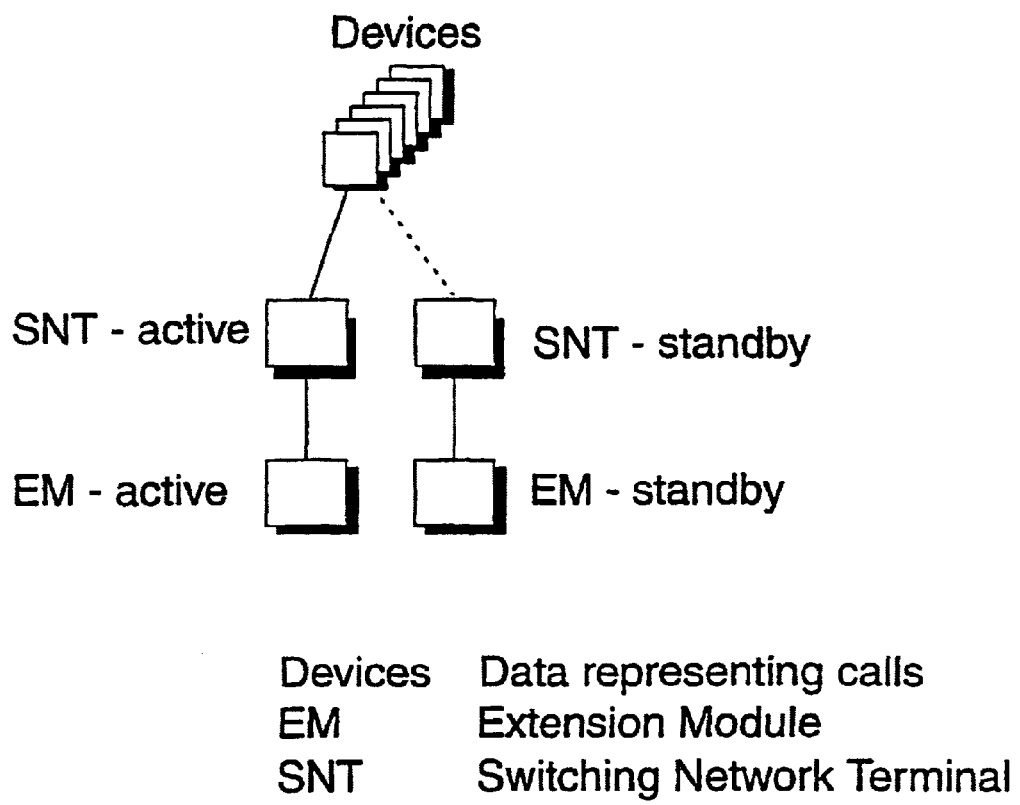
FIG. 2 is a block diagram illustrating a protection introduced at SNT level.

As already stated, FIG. 1 illustrates the principle of an existing information model, whereas FIG. 2 illustrates an embodiment of a known solution, wherein protection is introduced at SNT level.

Figure 3:
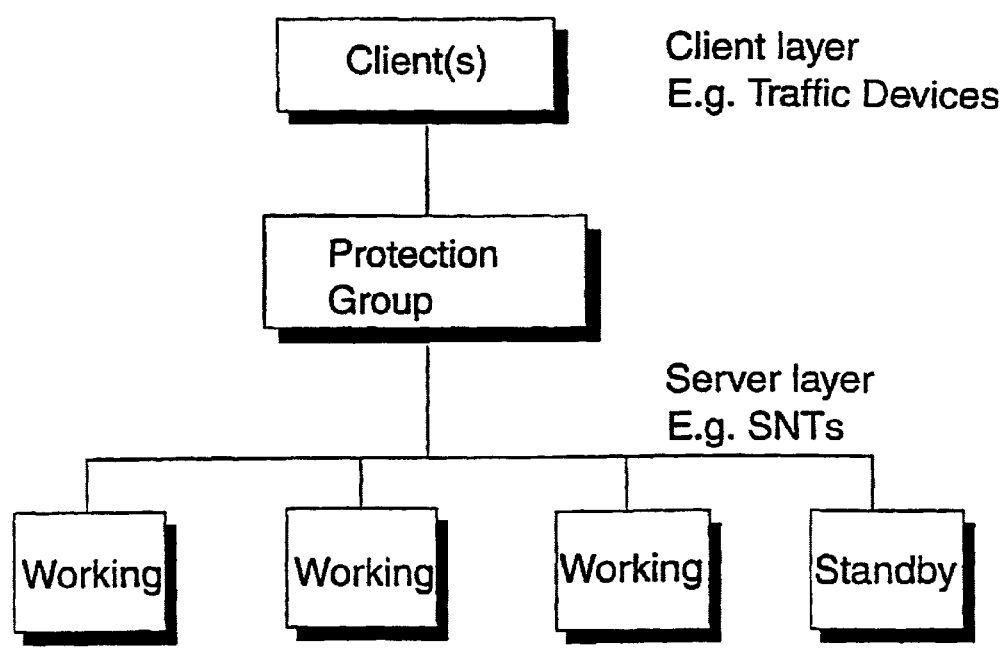
FIG. 3 is a block diagram illustrating the principle of the protection group concept according to the present invention.

Now, turning to FIG. 3, there is illustrated the principle of the protection group concept according to the present invention.

From this FIG. 3 it is seen that the protection group controls the configuration on server layer with respect to protection mechanisms, which means that the protection group administrates which server units should be working (active) and which should be standby units.

At the server layer the different server units have their own working state as before, and the units do not have any information about configurations for protection mechanisms.

In case of a fault on server layer, this is reported to said protection group, which group will then decide whether to switch to a standby unit or to inform the client that a fault has occurred, i.e. for possibly requesting a blocking of the client in question.

The new Exchange Terminal (ET) for SDH (STM-1, 155 Mbit/s) is used in the text below in order to try to explain the new concept. This is because the Protection Group concept was invented when studying how equipment protection and protection switching could be introduced for this new ET.

The suggested Protection Group concept is general and could be used for any equipment and protection mechanisms within the AXE system.

In connection with SSS (Subscriber Switching Subsystem) it has been seen that equipment protection & protection switching is also needed for Access products.

The Protection Group concept seems to be very well suited in order to solve the problem.

Figure 4:
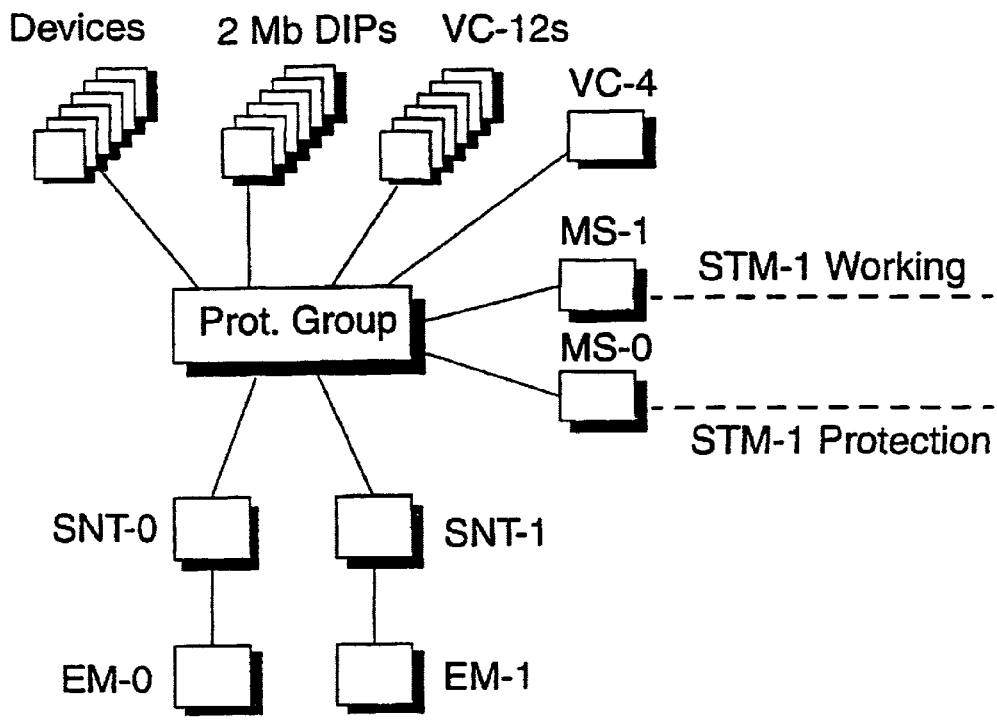
FIG. 4 is a block diagram illustrating an example of the present invention, especially a protection group concept for an SDH ET with MSP 1+1 protection.

In FIG. 4 there is illustrated another example of how the present invention can be implemented, especially in connection with a protection group concept for an SDH ET with MSP 1+1 protection.

Instead of connecting devices (and Digital Paths, if any) to the SNT, they are connected to a Protection Group. Also objects representing Virtual Containers and Multiplex Sections may also be connected to the Protection Group.

Prior to connection of devices and DIPs, and possibly Virtual Containers and Multiplex Sections, the Protection Group has been defined by command.

When connecting/defining the Protection Group it is specified which elements the Protection Group shall consist of (e.g. which SNTs). In addition it is also specified which equipment shall be the standby equipment and which should be the active equipment.

The type of Equipment Protection & Protection Switching to be used is also specified (1+1, n:1, n:m or some other type of protection).

In FIG. 4 an example of multiplex Section Protection 1+1 is shown. For each STM-1 interface (155 Mbit/s interface) there is a standby STM-1 interface (MS) and also standby equipment (SNT).

Figure 5:
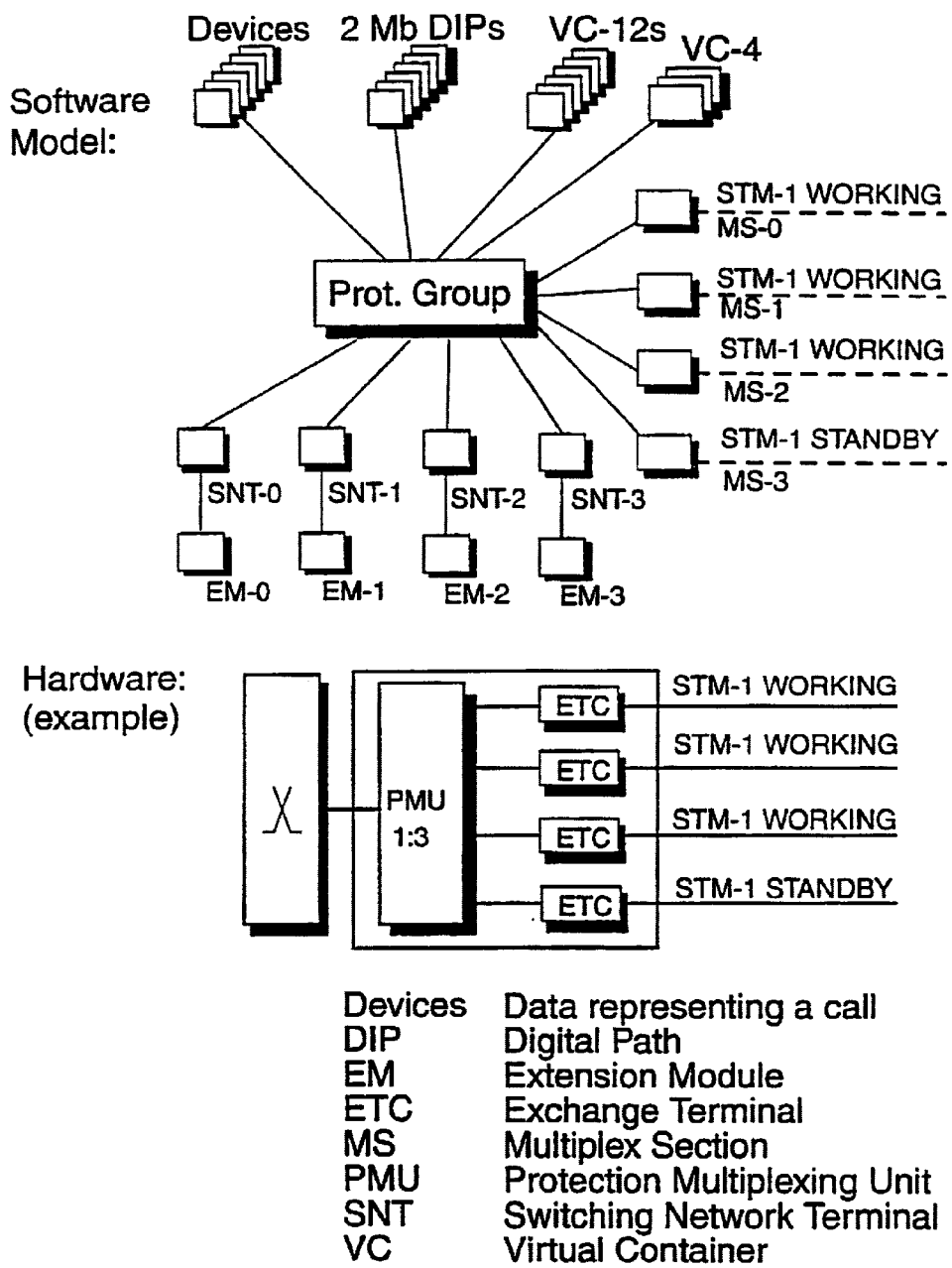
FIG. 5 is a block diagram illustrating a further example of the present invention, here in connection with an MSP 1:3 protection.

In connection with FIG. 5, an example is given wherein is used Multiplex Section protection 1:n, where n=3. This means that for n STM-1 interfaces there is a standby interface and standby equipment.

The Protection Group controls the protection mechanisms and has a number of commands and printouts associated with it in order to:

Define the Protection Group, i.e. which equipment/objects that form the Protection Group Define the Protection "algorithm", e.g. MSP 1+1, MSP 1:n or some other algorithm State representing the working state of the Protection Group Initiation/Termination of the Protection capability Manual Protection Switching Printing of configuration data Printing of working state of the Protection Group
Protection Switch event notifications
Alarms in case of faults that inhibit the protection switch capability
Other printouts, e.g. statistics for performance monitoring, such as for example Protection Switch Event Counts, Equipment Protection Event Counts etc.

The Protection Group will have its own working state which at any time represents the status of the protection switching capability, i.e. a working state indicating whether the Protection Group is working normally, in protection mode (one of the servers are faulty), manually forced, protected, blocked, etc.

The Protection Group also stores the protection configuration data so that it is easy to see which equipment is the active and standby equipment.

The Protection Group concept can be used for all types of equipment within the AXE.

The Protection Group is of general utility, and may therefore include server types other than SNTS, for example Access Units (AU), Remote Terminals, Signaling Terminals, and the like.

Figure 6:
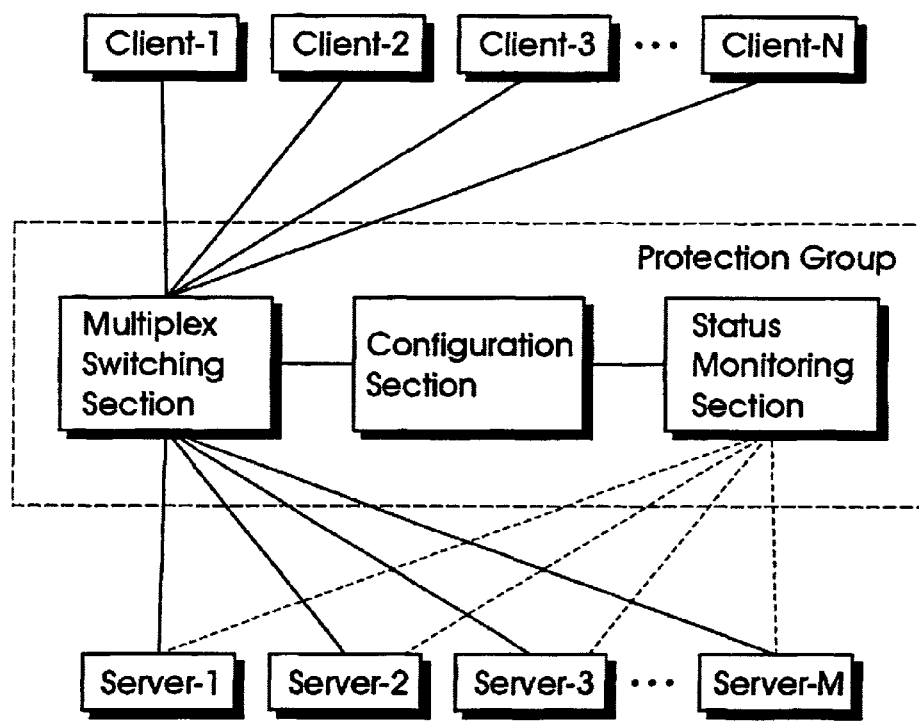
FIG. 6 is a functional block diagram illustrating an example of the present invention.

FIG. 6 is a functional block diagram illustrating an example of the present invention. The Protection Group is connected between a plurality of servers and a plurality of clients. The Protection Group includes a multiplex switching section for connecting any one of the plurality of clients to any one of the plurality of servers, a status monitoring section for monitoring the operational status of each of the plurality of servers, and a configuration section for storing information regarding which servers are capable of serving each of the clients. Whenever a working server fails, the status monitoring section determines that the working server has failed. The configuration section determines whether a standby server is available and selects a standby server that is capable of serving the clients that were being served by the failed server. The multiplex switching section then switches the clients that were being served by the failed server to the selected standby server.

Advantages

The advantage with Protection Group concept is that Equipment Protection and Protection Switching is controlled in a consistent way for all types of equipment and protection mechanisms.

One set of commands and printouts is used for all types of equipment and protection mechanisms.

It is easy to enhance/modify the protection mechanisms without affecting other existing objects within the information model.

The model is layered so that neither the objects at the server layer or client layer have to offer mechanisms for protection switching. E.g. an SNT is responsible for supervising its hardware and will behave as before, independent of whether it is working as a single SNT or working within a Protection Group. Of course, the SNT has to know that it has a Protection Group as its server layer. In case of an SNT fault, this is reported to the Protection Group, which decides whether to initiate a protection switch or not.

It is only the Protection Group that knows that the SNT is protected. Also at the client layer the clients do not know whether an SNT is protected or not.

Broadening

The Protection Group concept was originally invented for SNT handling products (e.g. ETs). However, the concept is general and can be used for any equipment and protection methods as described in this document.

REFERENCES

[1] ITU-T Recommendation G.782 (January 1994) "Types and General Characteristics of Synchronous digital Hierarchy (SDH) Equipment"

[2] ITU-T Recommendation G.783 (January 1994) "Characteristics of Synchronous Digital Hierarchy (SDH) Equipment Functional Blocks"

[3] ITU-T Recommendation G.803 (March 1993) "Architectures of Transport Networks Based on the Synchronous Digital Hierarchy (SDH)"

[4] ITU-T Recommendation G.841 (July 1995) "Types and Characteristics of SDH Network Protection Architectures"

[5] ETSI Draft Specification DE/TM-01015-3-1 (October 1995) "Transmission and Multiplexing (TM); Generic functional requirements for Synchronous Digital Hierarchy (SDH) equipment. Part 3-1: STM-N Regenerator & Multiplex Section Layer Functions". (Draft for ETS 300 417-3-1, approved but not yet printed)

[6] ETSI Draft Specification DE/TM-03025, version 1.9 (September 1995) "Transmission and Multiplexing (TM); SDH Network Protection schemes: Types and Characteristics"

[7] ETSI Draft Specification DE/TM-03041, version 1.6 (September 1995) "Transmission and Multiplexing (TM); SDH Network Protection Interworking"

[8] ETSI Draft Specification DE/TM-03042, version 1.4 (September 1995) "Transmission and Multiplexing (TM); SDH Network Protection schemes: APS Protocols and Operation"

| Abbreviations and Terms | |
|---|---|
| AU | Access Unit |
| EM | Extension Module (The Control System's representation of the hardware) |
| ET | Exchange Terminal |
| ETC | Exchange Terminal Circuit |
| DIP | Digital Path |
| MS | Multiplex Section |
| MSP 1 + 1 | Multiplex Section Protection 1 + 1 (For each Multiplex Section there is a Standby Multiplex Section) |
| MSP 1:n | Multiplex Section Protection 1:n (For n Multiplex Sections there is a Standby Multiplex Section) |
| PMU | Protection Multiplexer Unit |
| SDH | Synchronous Digital Hierarchy |
| SNT | Switching Network Terminal (The "Application Systems" representation of the hardware) |
| SSS | Subscriber Switching Subsystem |
| STM-1 | Synchronous Transport Module, level 1 (155 Mbit/s) |
| VC | Virtual Container |
| Devices | Information element that represents a call. There are also devices that represent a "handling device" for a certain function, for example a device handling a continuity check function when setting up a call. |
| Information Model | The information elements the operator can manipulate by commands. |
| Equipment Protection | This means that it is possible to switch to another equipment in case of an equipment fault. I.e. the equipment is protected by a standby unit. |
| Protection Switching | According to ITU-T Recommendation G.782 (reference 2) defined as: "the use of pre-assigned capacity between nodes to replace a failed or degraded transport entity". This means that in case |

| Abbreviations and Terms |
|---|
| of a transmission fault, the traffic is switched to another path. |

What is claimed is:

1. A method of protecting equipment and switching functionality in a telecommunication system having a plurality of servers serving a plurality of clients, wherein at least one server among the plurality of servers is a standby server, and the other servers are working servers, the method comprising the steps of:

connecting a protection group between the plurality of servers and the plurality of clients, said protection group including a multiplex switching section for connecting any one of the plurality of clients to any one of the plurality of servers, a status monitoring section for monitoring the operational status of each of the plurality of servers, and a configuration section for storing information regarding which servers are capable of serving each of the clients;

determining by the status monitoring section that a working server has failed;

selecting by the configuration section, a standby server that is capable of serving the clients that were being served by the failed server; and switching by the multiplex switching section, the clients that were being served by the failed server to the selected standby server.

2. The method of claim 1, wherein the step of selecting a standby server that is capable of serving the clients includes determining whether a standby server capable of serving the clients is available, and the method further comprises informing the clients that were being served by the failed server that a fault has occurred, upon determining that an appropriate server is not available.

3. The method of claim 1, further comprising communicating by the protection group with elements that are specified as belonging to said protection group, wherein said elements comprise a given number of interfaces and equipment for the multiplex section.

4. The method of claim 1, wherein the step of connecting the protection group includes connecting the protection group to a plurality of working servers and a single standby server.

5. The method of claim 1, wherein the step of connecting the protection group includes connecting the protection group to a plurality of working servers and a plurality of standby servers.

6. A system for protecting equipment and switching functionality in a telecommunication network, the system comprising:

a plurality of client devices for providing telecommunication services;

a plurality of servers serving the plurality of client devices, at least one server among the plurality of servers being a standby server, and the other servers being working servers; and protection group means connected between the plurality of client devices and the plurality of servers, said protection group means comprising:

a multiplex switching section for connecting any one of the plurality of client devices to any one of the plurality of servers;

a status monitoring section for monitoring the operational status of each of the plurality of servers; and a configuration section for storing information regarding which servers are capable of serving each of the client devices, wherein upon determining by the status monitoring section that a working server has failed, the configuration section selects a standby server that is capable of serving the client devices that were being served by the failed server, and the multiplex switching section switches the client devices that were being served by the failed server over to the selected standby server.

7. The system of claim 6, wherein said protection group means further comprises communication means for communicating both with the servers and the client devices, and whenever the configuration section determines that an appropriate standby server is not available, the communication means is utilized to inform the client devices that were being served by the failed server that a fault has occurred.

8. The system of claim 6, wherein said protection group means is configured to connect to a plurality of working servers and a single standby server.

9. The system of claim 6, wherein the configuration section includes storage means that stores relevant protection configuration data, including set-up commands, logs, or alarms.

10. The system of claim 6, wherein said protection group means is configured to connect to a plurality of working servers and a plurality of standby servers.

* * * * *